United States Patent
Lagarde (10) Patent No.: US 11,292,048 B2
(45) Date of Patent: Apr. 5, 2022

(54) METHODS FOR MANUFACTURING A SPRING, A SPRING BRAKE, AND A SPRING BRAKE COMPRISING A SPRING

(71) Applicant: SOMFY ACTIVITES SA, Cluses (FR)

(72) Inventor: Eric Lagarde, Sallanches (FR)

(73) Assignee: SOMFY ACTIVITES SA, Cluses (FR)

( * ) Notice: Subject to any disclaimer, the term of this patent is extended or adjusted under 35 U.S.C. 154(b) by 654 days.

(21) Appl. No.: 16/092,925

(22) PCT Filed: Apr. 14, 2017

(86) PCT No.: PCT/EP2017/059072
§ 371 (c)(1),
(2) Date: Oct. 11, 2018

(87) PCT Pub. No.: WO2017/178654
PCT Pub. Date: Oct. 19, 2017

(65) Prior Publication Data
US 2020/0180009 A1    Jun. 11, 2020

(30) Foreign Application Priority Data
Apr. 15, 2016 (FR) ...................................... 1653351

(51) Int. Cl.
*B21F 11/00* (2006.01)
*F16F 1/04* (2006.01)
(Continued)

(52) U.S. Cl.
CPC ............ *B21F 11/005* (2013.01); *F16D 49/04* (2013.01); *F16F 1/04* (2013.01); *G01B 11/08* (2013.01);
(Continued)

(58) Field of Classification Search
CPC ... F16D 49/04; F16F 1/04; F16F 1/125; F16F 1/127
See application file for complete search history.

(56) References Cited

U.S. PATENT DOCUMENTS 4,869,357 A * 9/1989 Batchelder ............ F16D 41/206
192/41 S
5,477,715 A * 12/1995 Kempf ..................... B21F 3/02
140/103
(Continued)

FOREIGN PATENT DOCUMENTS

CN        1787889 A        6/2006
CN      101839111 A        9/2010
(Continued)

OTHER PUBLICATIONS

International Search Report, PCTEP2017/059072, dated Jul. 13, 2017.
French Search Report, FR 1653351, dated Dec. 8, 2016.

*Primary Examiner* — Melanie Torres Williams
(74) *Attorney, Agent, or Firm* — Nixon & Vanderhye (57) ABSTRACT

Disclosed is a method for manufacturing a spring for a spring brake, including a shaping and cutting step f) including the following sub-steps: —f1) shaping a raw wire into a coil with a plurality of raw turns, the raw wire having: raw portions that extend from the end of the raw wire over at least one raw turn, and an intermediate portion between the raw portions, —f2) separating the first raw portion and the second raw portion of the raw wire by cutting, after implementing sub-step f1), and —f3) shaping a first tab (5), at a first end of the intermediate portion, after sub-step f1), and —f4) shaping a second tab (7), at a second end of the intermediate portion opposite the first end, after sub-step f1).

23 Claims, 6 Drawing Sheets

(51) Int. Cl.
*G01B 11/08* (2006.01)
*F16D 49/04* (2006.01)
*B21F 3/02* (2006.01)
*B21F 35/00* (2006.01)
*E06B 9/72* (2006.01)
*G01B 11/24* (2006.01)

(52) U.S. Cl.
CPC ................ *B21F 3/02* (2013.01); *B21F 35/00* (2013.01); *E06B 9/72* (2013.01); *G01B 11/24* (2013.01)

(56) References Cited

U.S. PATENT DOCUMENTS

| | | |
|---|---|---|
| 7,458,243 B2 | 12/2008 | Ruzovic et al. |
| 8,253,288 B2 | 8/2012 | Lagarde et al. |
| 8,469,171 B2 | 6/2013 | Lagarde et al. |
| 2005/0288889 A1 | 12/2005 | Wilson et al. |
| 2006/0230803 A1 | 10/2006 | Ruzovic et al. |
| 2010/0236891 A1 | 9/2010 | Lagarde et al. |
| 2010/0320855 A1 | 12/2010 | Lagarde et al. |
| 2011/0214467 A1 | 9/2011 | Krueger et al. |

FOREIGN PATENT DOCUMENTS

| | | | |
|---|---|---|---|
| DE | 10234501 A1 * | 2/2004 | ............ E05F 11/505 |
| DE | 102009027757 A1 * | 1/2011 | ............ E05F 11/505 |
| EP | 0 278 865 | 8/1988 | |
| EP | 0 976 909 | 2/2000 | |
| EP | 2 230 415 | 9/2010 | |
| EP | 2 230 425 A1 | 9/2010 | |
| EP | 2 267 330 | 12/2010 | |
| FR | 2 244 581 | 4/1975 | |
| JP | 2003-136171 | 5/2003 | |
| WO | WO-2011051017 A1 * | 5/2011 | ............. F16D 67/00 |

* cited by examiner

METHODS FOR MANUFACTURING A SPRING, A SPRING BRAKE, AND A SPRING BRAKE COMPRISING A SPRING

BACKGROUND OF THE INVENTION

Field of the Invention

The present invention relates to a method of manufacturing a spring, a method of manufacturing a spring brake, and a spring brake comprising a spring. This spring brake belongs, for example, to a motor gearbox of a rolling shutter, blind, or more generally a home screen.

Description of the Related Art

EP-A1-2 230 415 and EP-A1-2 267 330 each disclose an electric drive actuator of a home automation screen, wherein the electric actuator is provided with a spring brake comprising a helical spring and a friction drum against which the spring presses radially. The brake also comprises:
- an input part, which is connected, on the one hand, to a drive motor and, on the other hand, to a first leg of the spring, to drive this spring in rotation in a direction of decreasing contact effort between the spring and the friction drum, and
- an output part connected to both a second leg of the spring and the screen.

EP-A2-0 976 909 discloses a similar actuator, in which the helical spring, instead of exerting a radial external friction force on a drum, exerts an internal radial frictional force on a hub, which extends inside the turns of this spring.

However, spring brakes of the prior art are likely to generate noise, in particular during the lowering of the home screen. At least part of this noise is caused by the helical spring of the brake as a result of contact irregularities between the turns and the surface of the friction drum or friction hub.

BRIEF SUMMARY OF THE INVENTION

Accordingly, the invention proposes to solve the drawbacks of the above-mentioned prior art by proposing a new method of checking the conformity of the spring, which makes it possible to ensure that the spring is not noisy.

The invention relates to a method of manufacturing a spring comprising a wire comprising a plurality of turns wherein each turn is centered on a turn axis, while the spring is designed to be mounted within a spring brake and to be in radial frictional contact with a friction member of the spring brake, wherein the manufacturing method comprises a step f) of conformation and cutting comprising the following substeps:
  f1) winding conformation of a raw wire according to a plurality of raw turns, so that each raw turn is substantially coaxial with a common main axis, wherein the raw wire has:
    a first raw portion extending from a first end of the raw wire over at least one raw turn,
    a second raw portion extending from a second end of the raw wire, opposite the first end of the raw wire over at least one raw turn, and
    an intermediate portion between the first raw portion and the second raw portion,
  f2) separation by cutting the first raw portion and the second raw portion of the raw wire after the implementation of the substep f1), wherein the intermediate portion then becomes the wire of the spring, and wherein at least a portion of the raw turns of the intermediate portion become the turns of the spring, and
  f3) conformation by folding of a first tab at a first end of the intermediate portion after the substep f1) and before or after the substep f2), and
  f4) conformation by folding of a second tab at a second end of the intermediate portion opposite the first end, after the substep f1) and before or after the substep f2).

Thanks to the invention, at least one raw turn is separated from each end of the intermediate portion, which reduces the risk of non-compliance of the spring. In fact, in practice, the conformance of the raw wire in the form of a spiral generally results in defects in shape on the raw end turns. As the raw portions include these end turns, their separation from the manufactured spring reduces the risk of non-compliance of the latter. The spring produced is then free of defects in shape, particularly with regard to the contour of the outer turn and/or inner turn, which is intended to be in frictional contact with the friction member of the spring brake. It is therefore possible to produce a noiseless spring brake, since any defects in the shape of the spring, which are partly responsible for the noise of the spring brake in the prior art, have been removed.

Other optional and advantageous features of the invention are defined below:
  The first raw portion extends over 1.25 raw turns and wherein the second raw portion extends over 1.25 raw turns.
  The wire of the spring formed during step f) defines for each turn in projection in a turn plane orthogonal with respect to the turn axis, an outer turn contour and an inner turn contour, and wherein the manufacturing method further comprises a step g) that is implemented after step f), of a method of checking compliance of the spring thus formed, wherein this control method comprises the following steps:
    a) defining, for each turn, an outer tolerance circle centered on the turn axis and drawn in the turn plane, wherein the outer tolerance circle has an outer radius, and
    b) defining, for each turn, an inner tolerance circle centered on the turn axis and drawn in the turn plane, wherein the inner tolerance circle has an inner radius, whose value is less than that of the outer radius, of a predetermined tolerance interval value,
    c) characterizing the conformity of the spring, wherein this characterization step itself comprises the following substeps:
      c1) characterizing the spring as being compliant if for each turn, each selected portion of the outer turn contour lies between the outer tolerance circle and the inner tolerance circle,
      c2) characterization of the spring as being non-compliant, if for at least one of the turns, at least one selected portion of the outer turn contour protrudes, radially with respect to the turn axis, outwards of the outer tolerance circle or inwards of the inner tolerance circle in at least one point,
    or the following substeps:
      c3) characterization of the spring as being compliant, if for each turn, any selected portion of the inner turn contour is between the outer tolerance circle and the inner tolerance circle,
      c4) characterization of the spring as being non-compliant, if for at least one of the turns, at least a selected portion of the inner turn contour protrudes radially outwards from the outer tolerance circle or towards the inside the inner tolerance circle in at least one point wherein the manufacturing method comprises a step of integrating the spring into the spring brake only if the spring is characterized as being compliant in step g).

The portion chosen during step g) extends over the entire turn in question.

The spring comprises a first excluded portion of the wire, extending from a first end of the wire, and a second excluded portion of the wire, extending from a second end of the wire opposite the first end, wherein the first excluded portion and the second excluded portion each extend only over a portion of the turn of the spring, and wherein in step c) of characterizing the compliance of the spring by excluding the first excluded portion and the second excluded portion of any chosen portion.

The sub-steps c1) and c2) are carried out if the wire is designed to be in external radial frictional contact with the friction member, wherein the friction member preferably constitutes a drum in which the spring is designed to be housed, and the sub-steps c3) and c4) are carried out if the wire is designed to be in contact with the friction member with internal radial friction, wherein the friction member preferably constitutes a hub around which the spring is designed to be mounted.

The tolerance range value is between 0.05 and 0.15 millimeters, preferably equal to 0.10 millimeters.

Step c) is performed while the spring is in a free state.

During the sub-step c1), the spring may be characterized as being compliant only if at least one selected portion of an external guide curve, defined for each turn of the spring, is included between two coaxial tolerance cylinders, and during the sub-step c2), the spring may be characterized as being compliant only if at least one selected portion of an internal guide curve, defined for each turn of the spring, is between two coaxial tolerance cylinders.

The invention also relates to a method of manufacturing a spring brake wherein a spring, obtained by means of a manufacturing method as defined below, is mounted in a spring brake, wherein the spring is in radial frictional contact with a friction member of the spring brake.

The invention also relates to a spring brake comprising a spring, wherein the spring comprises a wire wound in a plurality of turns each of which is centered on a turn axis, wherein the turns are included in a spiral according to which the spring is shaped, and the spiral is intended to be coaxial with a main axis of the spring, wherein the spring is mounted within the spring brake and in radial frictional contact with a friction member of the spring brake, a spring wherein:

a first end portion of the wire, which extends from a first end of the wire, out of the spiral of the spring, is shaped according to a first tab, a second end portion of the wire, which extends from a second end of the wire, out of the spiral of the spring, is shaped according to a second tab, the first tab and the second tab are each directed in a substantially radial direction towards the inside of the spring, and in projection in a plane orthogonal to the main axis, the first tab and the second tab are curved towards each other.

Other optional and advantageous features of the invention are defined below:

The wire defines for each turn, in projection in a turn plane orthogonal to the turn axis, an outer coil contour and an inner coil contour, wherein the spring is wherein:

for outer tolerance circles defined for each turn, each outer tolerance circle is centered on the turn axis and drawn in the turn plane, wherein each outer tolerance circle has an outer radius, and for inner tolerance circles defined for each turn, each inner tolerance circle is centered on the turn axis and drawn in the turn plane, each inner tolerance circle has an inner radius whose value is less than that of the outer radius with a predetermined tolerance interval value of between 0.05 and 0.15 millimeters, preferably equal to 0.10 millimeters, wherein:

any selected portion of the outer turn contour of each turn lies between the outer tolerance circle and the inner tolerance circle, or wherein:

any chosen portion of the inner turn contour of each turn lies between the outer tolerance circle and the inner tolerance circle.

The selected portion extends over the entire turn in question.

The spring is obtained using a manufacturing method as defined above.

BRIEF DESCRIPTION OF THE DRAWINGS

The invention will be better understood upon reading the description which follows, given solely by way of nonlimiting example and with reference to the drawing, wherein.

DETAILED DESCRIPTION OF THE PREFERRED EMBODIMENTS

Figure 1:
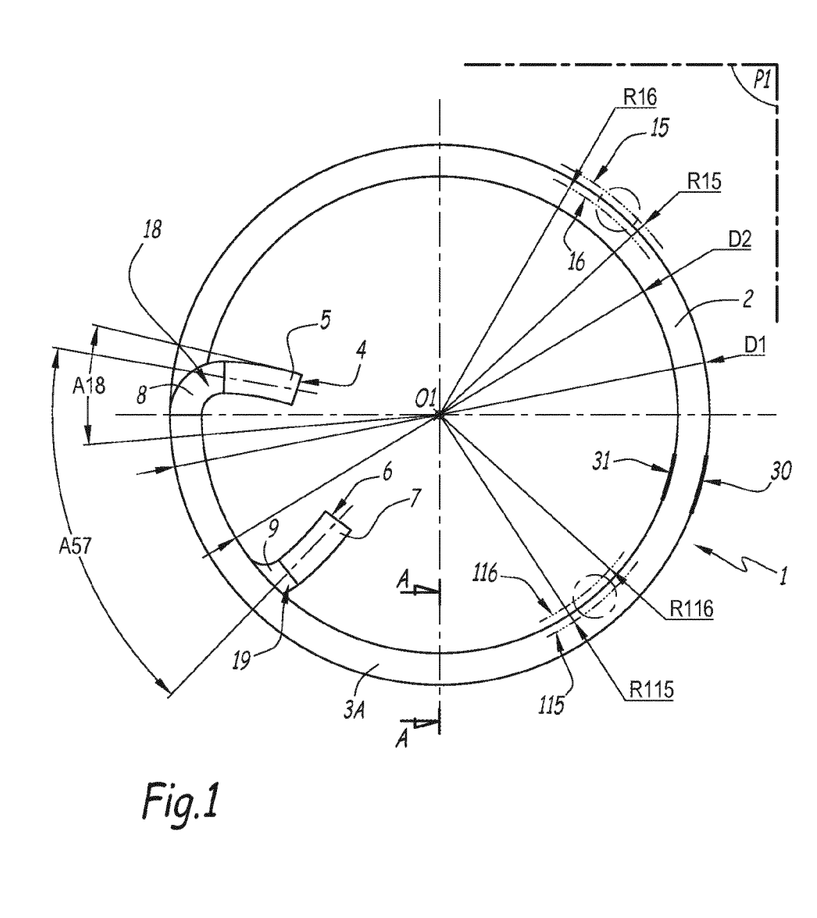
FIG. 1 shows a front view of the spring of a brake spring according to the invention, wherein a first and a second embodiment of the invention are shown.
Figure 2:
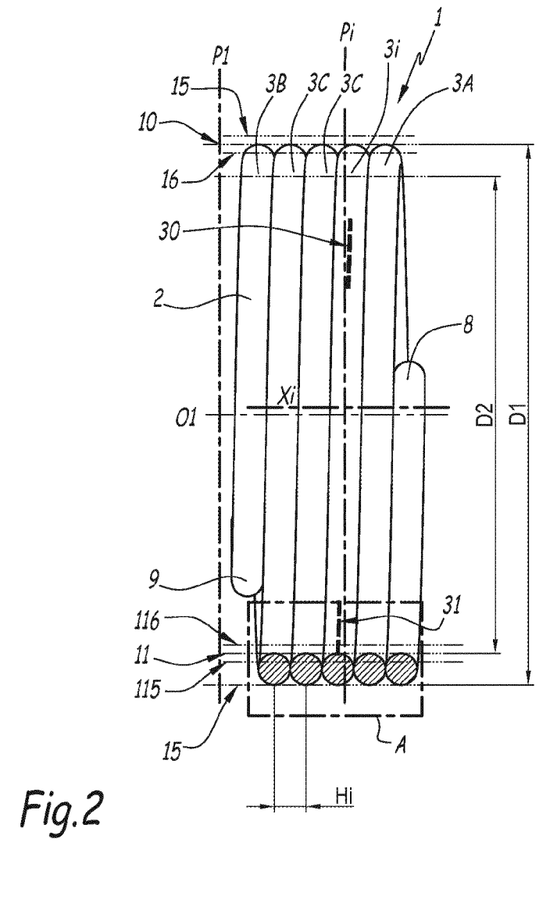
FIG. 2 shows a side view of the spring of FIG. 1, wherein a section is cut along the line A-A of FIG. 1.
Figure 3:
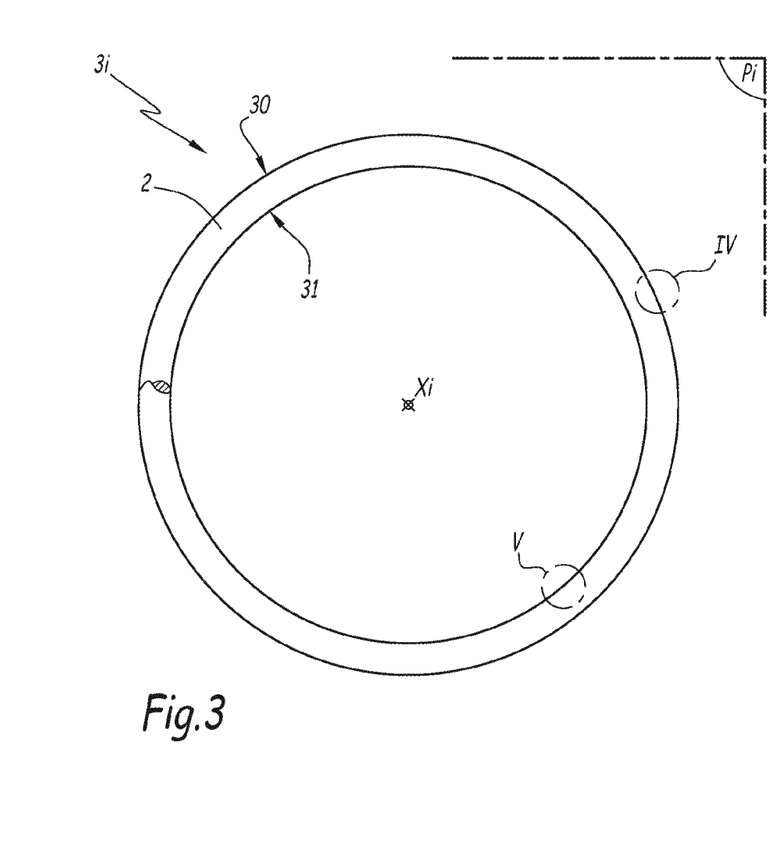
FIG. 3 shows a front view of a turn belonging to the spring of FIGS. 1 and 2.

The spring 1 shown in FIGS. 1 and 2 comprises a wire 2 shaped in the form of a spiral, i.e. helically wound. The wire 2 is thus wound in a plurality of turns $3i$ included in the spiral. The spiral is intended to be coaxial with a common main axis O1 of the spring 1, so that each turn $3i$ is substantially centered on this main axis O1. Each turn $3i$ defines a turn axis Xi with which the turn $3i$ in question is coaxial, as illustrated in FIGS. 2 and 3. When the spring 1 is made, it is desired that the turn axis Xi of each turn is ideally coaxial with the main axis O1, which is not necessarily the case in practice, due to possible imperfections in the spring 1. The spiral of the spring 1 is intended to extend in a straight cylinder with a circular base that is coaxial with the main axis O1.

A "turn" is understood to mean a portion of the wire 2, which is included in the spiral of the spring 1, and which extends coaxially with the turn axis Xi specific to the turn 3$i$ in question, while describing a winding on an angular sector of 360° (degrees) about the axis Xi.

In practice, each turn 3$i$ defines a pitch Hi along the axis O1, shown in FIG. 2. In this example, the spring is designed so that the average pitch Hi of the turns 3$i$ has a value of about 1.9 mm (millimeters).

The wire 2 defines, for each turn 3$i$ of its spiral, an outer guide curve 30 and an inner guide curve 31, wherein only one of the external guide curves 30 and only one of these internal guide curves 31 are shown in the figures. Also defined for each turn 3$i$ are:
- a turn plane Pi that is orthogonal to the turn axis Xi of the turn 3$i$ in question,
- an outer turn contour 10, corresponding to a projection along the axis Xi in the plane Pi of the external guide curve 30 of the turn 3$i$ in question, and
- an inner coil contour 11 corresponding to a projection along the axis Xi in the plane Pi of the internal guide curve 31 of the turn 3$i$ in question.

The figures show only one of these exterior turn contours 10, only one of these inner turn contours 11, only one of these planes Pi, and only one of these axes Xi.

The spring 1 is so designed that the contours 10 and 11 thus defined are circular and centered on the axis Xi of the turn 3$i$ in question. In fact, the contours 10 and 11 do not have a perfectly circular shape as shown schematically in FIGS. 4 and 5.

The spring 1 is manufactured to have a predetermined outer diameter D1, corresponding to the average diameter of the external guide curves 30. An inner diameter D2 is also defined, corresponding to the average diameter of the internal guide curves 31.

As shown in FIG. 2, the turns 3$i$ of the spring 1 are preferably contiguous, i.e. the wire 2 of a first turn 3$i$ is in contact with the wire 2 of a second turn 3$i$ adjacent to the first turn 3$i$, over the entire circumference of the turn.

In the example shown in FIGS. 1 and 2, the winding of the turns 3$i$ is to the left. Alternatively, the winding of the turns 3$i$ may be to the right.

A theoretical projection plane P1 orthogonal to the axis O1 and visible in FIGS. 1 and 2 is defined.

The wire 2 has a first end 4 and a second end 6 opposite the first end 4.

A first end portion of the wire 2, which extends out of the spiral of the spring 1 from the first end 4, is shaped according to a first tab 5 that is visible in FIG. 1. A second end portion of the wire 2, which extends out of the spiral of the spring 1 from the second end 6, is shaped according to a second tab 7. The first tab 5 and the second tab 7 are each directed in a substantially radial direction according to a first embodiment, towards the inside of the spring 1, in particular in the direction of the main axis O1. The tabs 5 and 7 define between them a tab angle A57 with respect to the axis O1, in projection in the projection plane P1. As projected in the plane P1, the tabs 5 and 7 are slightly curved towards each other. Each tab 5 and 7 extends in a plane orthogonal to the axis O1. The particular shape of the tabs 5 and 7 is obtained according to the particular manufacturing method of the spring described below. In practice, the curvature of the tabs 5 and 7 substantially corresponds to the curvature of the turns 3$i$.

The tab 5 extends between the first end 4 and a first fold 8 of the wire 2 at which a first end turn 3A of the wire 2 begins. The tab 7 extends between the second end 6 and a second fold 9 of the wire 2 at which a second end turn 3B of the wire 2 opposite the first end turn 3A begins. In other words, the folds 8 and 9 mark off the spiral of the spring 1. The turns 3$i$ extending between the end turns 3A and 3B are designated "intermediate turns 30".

The spring 1 is a torsion spring, which is designed to interact with members exerting torques about the main axis O1, wherein these torques are applied, in particular, on the tabs 5 and 7.

Figure 8:
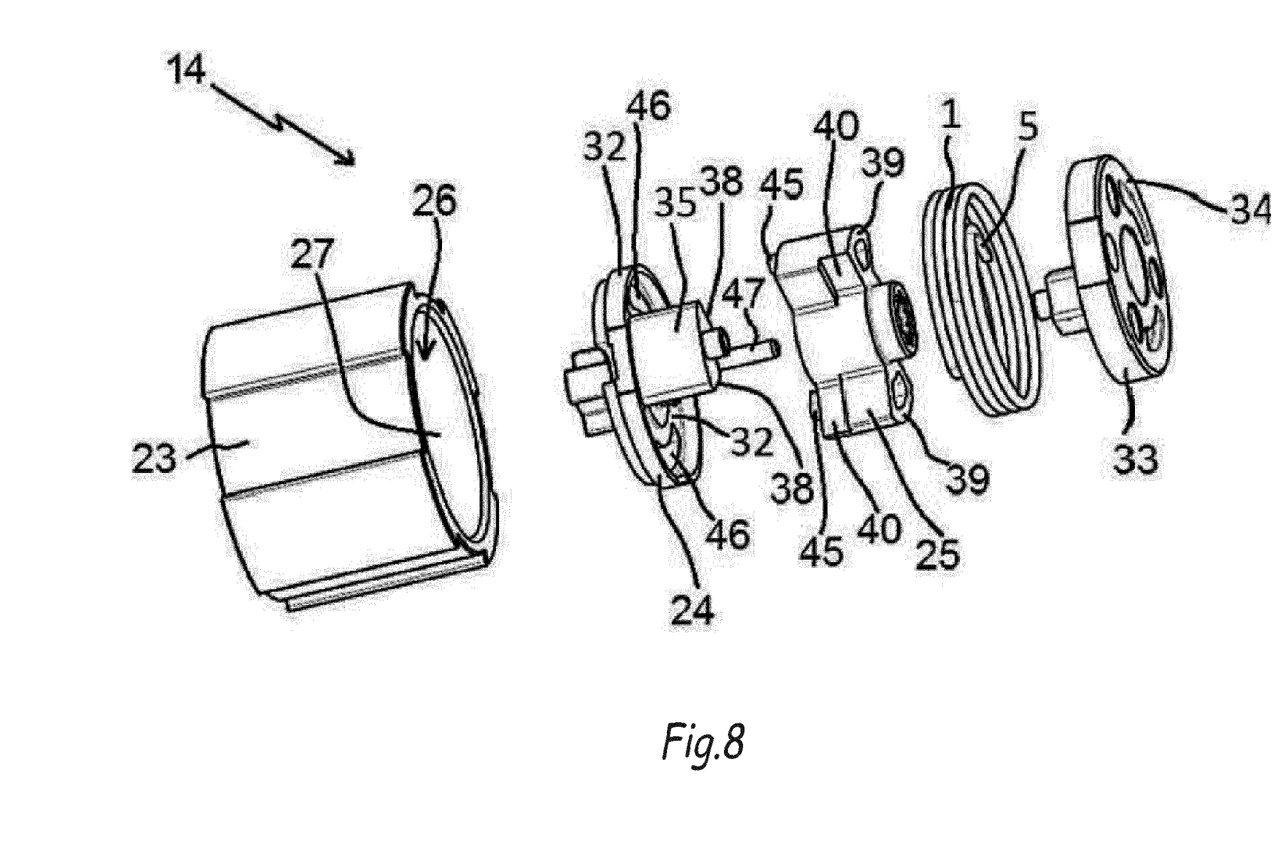
FIG. 8 shows an exploded view of a spring brake according to the invention.
Figure 9:
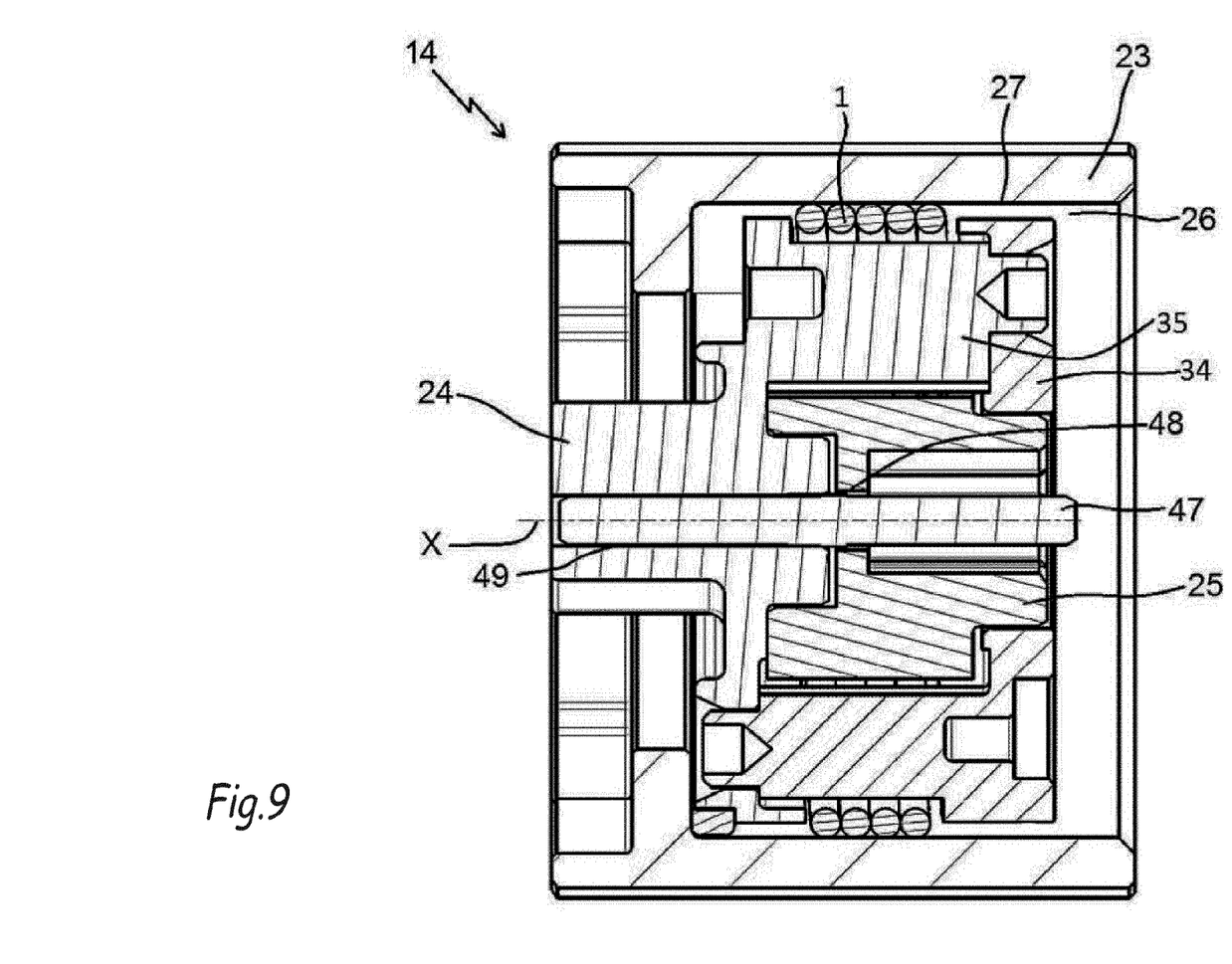
FIG. 9 shows a section of the spring brake of FIG. 8, shown assembled.

The spring 1 of the first embodiment is designed to be mounted within a spring brake 14, as shown in FIGS. 8 and 9, and to be in radial frictional contact with a friction member of the spring brake. In practice, it is all or part of the spiral of the wire 2 which is in frictional contact. More specifically, the wire 2 is in frictional contact at all or part of the external guide curves 30 of the turns 3$i$.

In the first embodiment, the friction member of the spring brake 14 is constituted, for example, by a ring-shaped drum 23 in which the spring 1 is designed to be housed in order to exert a frictional force by increasing the outer diameter D1, as is the case in EP-A1-2 230 415 and EP-A1-2 267 330. In this case, the spring 1 is a so-called "spreading" spring.

Thus, the spring brake 14 comprises at least one spring 1, a drum 23, an input member 24 and an output member 25.

The drum 23 comprises a housing 26. In this case, the housing 26 of the drum 23 is cylindrical. The spring 1, the input member 24 and the output member 25 are arranged inside the housing 26 of the drum 23 in the assembled configuration of the spring brake 14. The output member 25 is arranged to face the input member 24.

In this case, the spring 1 comprises a plurality of turns. The turns of the spring 1 are centered on an axis that is coincident with the axis of rotation X, when the spring brake 14 is assembled and then mounted in an electric actuator (not shown). Similarly, the input member 24 and the output member 25 are centered on an axis that is coincident with the axis of rotation X when the spring brake 14 is assembled and then mounted in the electric actuator.

An internal friction surface 27 of the housing 26 of the drum 23 is designed to interact with at least one turn of the spring 1. In this way, at least one turn of the spring 1 is radially constrained by the housing 26 of the drum 23.

In this case, the spring 1 is press-fitted inside the housing 26 of the drum 23 in order to frictionally secure the spring 1 and the drum 23 when the spring 1 is at rest.

Each end of the spring 1 forms a tab 5, 7 extending radially or axially with respect to the axis of rotation X of the spring brake 14.

In the embodiment shown in FIGS. 1 to 9, the tabs 5, 7 of the spring 1 extend radially with respect to the axis of rotation X of the spring brake 14 and towards the inside of the spring 1, in particular from the turns of the spring 1 to the central axis of the spring 1.

The input member 24 is rotated by an electric motor (not shown). In the exemplary embodiment illustrated, the input member 24 comprises a drive tooth 35 mounted on a first plate 32 of the input member. The drive tooth 35 of the input member 24 is inserted inside the spring 1 when the spring brake 14 is assembled. The drive tooth 35 of the input member 24 is arranged between the two tabs 5, 7 of the spring 1 and interacts with one or other of the tabs 5, 7 of the spring 1 according to the direction of rotation generated by the electric motor.

In this case, and as illustrated in FIGS. 8 and 9, the spring 1 and the output member 25 are held axially between the first plate 32 of the input member 24 and a second plate 34 of a cover 33.

The first and second plates 32, 34 are integral in rotation about the axis of rotation X of the spring brake 14. The output member 25 transmits the movement to a screen, for example a screen for privacy or a sunscreen.

In the exemplary embodiment illustrated in FIGS. 8 and 9, the output member 25 comprises two lugs 39. The lugs 39 of the output member 25 are inserted inside the spring 1 when the spring brake 14 is assembled.

The lugs 39 of the output member 25 respectively comprise a recess 40. The recess 40 of each of the lugs 39 of the output member 25 is configured to interact with one of the tabs 5 and 7 of the spring 1.

The lugs 39 of the output member 25 further comprise respectively a projecting element 45. The projecting element 45 of each of the lugs 39 of the output member 25 extends parallel to the axis of rotation. X of the spring brake 14, and, in particular, towards the input member 24 when the spring brake 14 is assembled. The projecting element 45 of each of the lugs 39 of the output member 25 is configured to interact with a hole 46 of the input member 24 when the spring brake 14 is assembled.

In one embodiment, the peripheral face of the projecting element 45 of one of the lugs 39 of the output member 25 may be brought into contact with the contour of the corresponding hole 46 of the input member 24, when one of the driving faces 38 of the driving tooth 35 of the input member 24 is in contact with the face of the corresponding lug 39 of the output member 25.

In this case, and as illustrated in FIGS. 8 and 9, the output member 25 is centered relative to the input member 24 by means of an axle 47. The axle 47 is inserted, on the one hand, into a bore 48 of the output member 25 and, on the other hand, into a bore 49 of the input member 24.

The input member 24, in particular the drive tooth 35, is configured to interact with at least one of the tabs 5 and 7 of the spring 1 in order to rotate the spring 1 about the axis of rotation X of the spring brake 14 in a first direction of rotation.

Such a movement releases the spring brake 14.

The friction force between at least one turn of the spring 1 and the inner surface 27 of the housing 26 of the drum 23 is decreased while the spring 1 is driven in rotation in the first direction of rotation.

In other words, this movement tends to reduce the diameter of the outer housing of the spring 1 and thus to reduce the radial constraint between the spring 1 and the inner surface 27 of the housing 26 of the drum 23.

Thus, the movement generated by the electric motor may be transmitted from the input member 24 to the output member 25.

The outer housing of the spring 1 is defined by the external generators of the turns of the spring 1.

The output member 25, in particular one of the lugs 39, is designed to interact with at least one of the tabs 5, 7 of the spring 1 in order to rotate the spring 1 about the axis of rotation X of the spring brake 14 in a second direction of rotation.

Such a movement activates the spring brake 14, i.e. it tends to block or slow the rotation of the spring 1 inside the housing 26 of the rotary drum 23.

The friction force between at least one turn of the spring 1 and the inner surface 27 of the housing 26 of the drum 23 is increased while the spring 1 is driven in rotation in the second direction of rotation.

In other words, this movement tends to increase the diameter of the outer casing of the spring 1, in particular by bringing the tabs 5 and 7 of the spring 1 closer together, and therefore increasing the radial constraint between the spring 1 and the inner surface 27 of the housing 26 of the drum 23.

Advantageously, the spring brake 14 comprises a first lubricant (not shown), arranged between the spring 1 and the inner surface 27 of the housing 26 of the drum 23. The first lubricant is preferably grease.

Thus, the spring 1 is designed to move between a free state as shown in FIGS. 1 and 2, a mounted state and a constrained state. The free state corresponds to a state in which the spring is not linked to any other part. When the spring 1 is mounted within the spring brake, the spring 1 is subjected to constraints in this assembled state. The constrained state corresponds to a state in which the spring is subjected to a torque on at least one of the tabs 5 and 7, or generally to constraints or forces sufficient to cause elastic deformation of the wire 2. When the spring 1 passes from the free state to the constrained state or to the mounted state, the spring 1 is deformed so that the value of the diameters D1 and D2 varies.

In the free state, the spring 1 has a nominal number of turns $3i$. In this case, the spring 1 of this example comprises a nominal number of turns $3i$ between four and six turns.

In the free state, the tab angle A57 has a nominal value, for example about 56°. In the constrained state, the value of the tab angle A57 differs from the nominal value. In this example, the spring 1 is manufactured so that the diameter D1 has a value of 32.4 mm, in the free state.

Before integrating this spreading spring 1 in the spring brake, a method of compliance control of the spring 1 is implemented. With this control method the spring is checked to be free of geometry defects, especially which relate to the contour of the outer turn and/or of the interior of the turn, which is intended to be in frictional contact with a friction member of the spring brake. In fact, the possible geometry defects of the spring, which may be caused by the spring manufacturing method, are at least partly responsible for the noise of the spring brake. Thus, the spring may be checked before being integrated in the spring brake, which allows, in particular, to obtain a noiseless spring brake by implementing only a compliant spring.

Figures 4, 5:
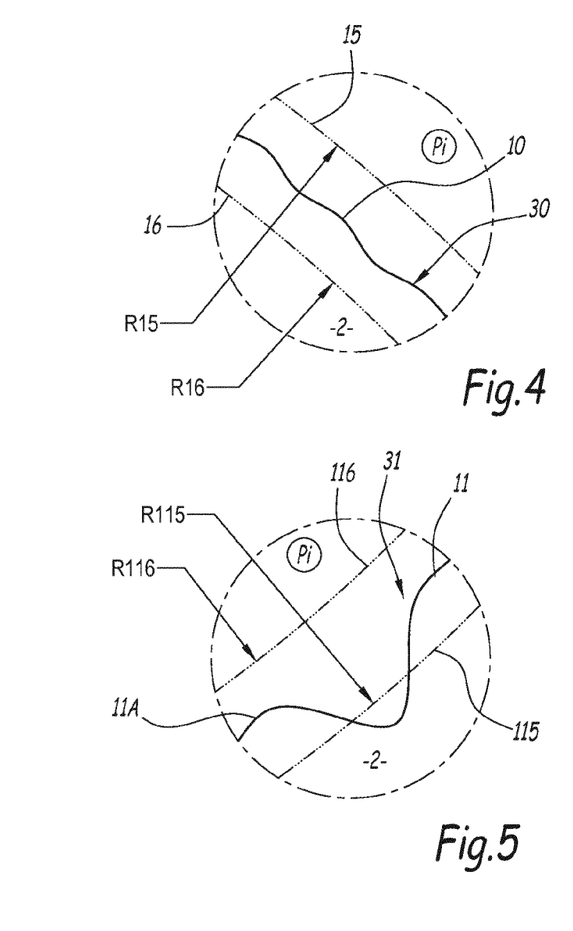
FIG. 4 shows a detail of FIG. 3 along the circle IV, for the first embodiment of the invention.
FIG. 5 shows a detail of FIG. 3 along the circle V, for the second embodiment of the invention.

This method of checking compliance comprises a main step of checking the circularity of the turns $3i$. For this, a perfect outer circle with a tolerance 15 and with a radius R15, i.e. the outer radius, is defined for each turn $3i$. For each turn $3i$, this circle 15 is drawn in the turn plane Pi by centering it on the turn axis Xi, as illustrated in FIGS. 2 and 4. A perfect inner circle with a tolerance 16 and with a radius R16, i.e. the inner radius, is also defined for each turn $3i$. In FIG. 1, only a portion of the circles 15 and 16 is shown. The inner radius R16 is smaller than the outer radius R15 by a predetermined tolerance interval value. In other words, the predetermined tolerance interval value is equal to the absolute value of the difference between the value of the inner radius R16 and that of the outer radius R15. For each turn $3i$, this circle 16 is drawn in the turn plane Pi by centering it on the turn axis Xi, as shown in FIGS. 2 and 4. For the sake of clarity of the path, the radii R15 and R16 of the circles 15 and 16 are not shown in scale in FIGS. 1 and 2.

In this example of a spreading spring 1, the tolerance interval value is between 0.05 and 0.15 millimeters, preferably equal to 0.10 millimeters.

In the case of the spreading spring 1 in the first embodiment, as shown in FIG. 4, it is checked, for example by means of a three-dimensional measuring machine or any other suitable metrological tool, that a selected portion of the contour of the outer turn 10 of each turn 3i is between the outer tolerance circle 15 and the inner tolerance circle 16. In FIG. 4, this condition is checked. Checking this condition involves checking the circularity of each turn 3i. This check is performed while the spring 1 is in the free state. In practice, it is checked for each turn 3i in question, that there is no point of the selected portion of the contour 10 that is positioned outside the circle 15 or inside the circle 16. If this condition is confirmed, it is characterized, i.e. considered, that the spring 1 is compliant and may be integrated with the spring brake. If this condition is confirmed, then it confirms, before mounting the spring 1 in the spring brake, that the spring brake is noiseless once the spring 1 is mounted. If this condition is not satisfied, i.e. if the chosen portion of the turn contour 10 of at least one of the turns 3i is outside the circle 15 or inside the circle 16 in at least one point radially to the axis Xi, it is characterized that the spring 1 is non-compliant and that it is likely to produce noise when integrated with the spring brake.

The chosen portion of the contour of the outer turn 10 preferably corresponds to the portion of a turn intended to be in frictional contact with the friction member of the spring brake.

The chosen portion of each turn 3i may extend over only a portion of the turn 3i in question, for example over a portion of 90° of the turn 3i. Alternatively, several portions chosen per turn 3i are defined, wherein the linking of the selected portions cover the entire turn 3i in question. Preferably, a single portion chosen per turn 3i is defined and extends over the entire turn 3i in question. Preferably, it is checked that any selected portion of the contour 10 of each turn 3i is between the circles 15 and 16 when the spring 1 is in the free state. If this condition is not satisfied, i.e. if at least a selected portion is not between the circles 15 and 16, the spring 1 is characterized as being non-compliant.

A first excluded portion 18 that is visible in FIG. 1, extends from the first end 4 of the wire 2 and beyond the fold 8 of the latter. The first excluded portion 18 extends over an angular sector A18 that is visible in FIG. 1 and is defined with respect to the axis O1 and extends between an end edge of the tab 5 to a point of the first end turn 3A, preferably at the edge of the fold 8. The first excluded portion 18 thus extends over only a portion of the first end turn 3A, and also includes the fold 8 and the tab 5. In this example, the angular sector A18 is equal to 15°. A second excluded portion 19 extends from the second end 6 of the wire 2 and beyond the fold 9 of the latter. The second excluded portion 19 extends over an angular sector similar to sector A18 (not shown). The angular sector of the excluded portion 19 is defined relative to the axis O1 and extends between an end edge of the tab 7 to a point of the second end turn 3B. The second excluded portion 19 thus extends over only a portion of the second end turn 3B, and also includes the fold 9 and the tab 7. In this example, the angular sector of the excluded portion 19 is also 15°. Preferably, exclusion of the excluded portions 18 and 19 of the wire 2 as defined below, is excluded. In other words, the selected portions of the end turns 3A and 3B do not cover the excluded portions 18 and 19, respectively.

Figure 10:
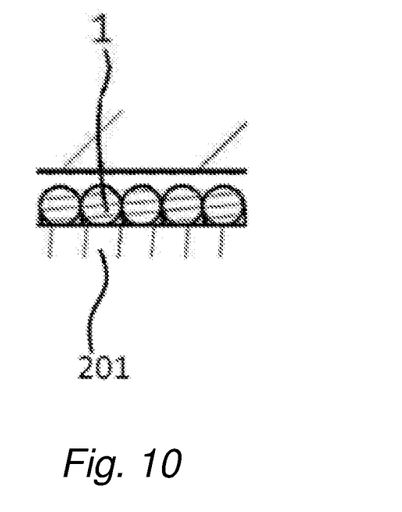
FIG. 10 shows the exemplary spring of FIG. 9 with a hub.

In a second embodiment, all or part of the internal guide curves 31 of the spring 1 is/are designed to be in contact through internal radial friction with the friction member of the spring brake. In this case, the friction member is, for example, a hub 201, illustrated in FIG. 10, around which the spring 1 is designed to be mounted, in order to exert a friction force by reducing the inside diameter D2, as is the case in EP-A2-0 976 909. In this case, the spring 1 is a said to be a "clamping" spring.

Before integrating this clamping spring 1 in the spring brake, a method of checking the compliance of the spring 1, similar to that described for the case of the spreading spring 1, is implemented but it is applied to the inner contour 11.

More precisely, an outer perfect circle with a tolerance 115 and with a radius R115, referred to as the outer radius, is defined for each turn 3i. For each turn 3i, this circle 115 is drawn in the turn plane Pi by centering it on the turn axis Xi as shown in FIGS. 2 and 5. A perfect inner circle with a tolerance 116 and with a radius R116, referred to as the inner radius, is also defined for each spire 3i. The inner radius R116 is smaller than the outer radius R115 by a predetermined tolerance interval value. In other words, the predetermined tolerance interval value is equal to the absolute value of the difference between the value of the inner radius R116 and that of the outer radius R115. In FIG. 1, only a portion of the circles 115 and 116 is shown. For each turn 3i, the circle 116 is drawn in the turn plane Pi by centering it on the turn axis Xi, as shown in FIGS. 2 and 5. For the sake of clarity of the path, the radii R115 and R116 of the circles 115 and 116 are not shown to scale in FIGS. 1 and 2.

In this example of a clamping spring 1, the tolerance interval value is between 0.05 and 0.15 millimeters, preferably equal to 0.10 millimeters.

In the case of the clamping spring 1 as shown in FIG. 5, it is checked for example by means of a three-dimensional measuring machine or any other suitable metrological tool, that a selected portion of the inner turn contour 11 of each turn 3i is between the outer circle with a tolerance 115 and the inner circle with a tolerance 116. This check is carried out while the spring 1 is in the free state. In practice, it is checked that there is no point of the selected portion of the contour 11 that is positioned outside the circle 115 or inside the circle 116 for each turn 3i. If this condition is confirmed, it is characterized, i.e. considered that the clamping spring 1 is compliant and may be integrated with the spring brake. If this condition is not satisfied, i.e. if the chosen portion of the turn contour 11 of at least one turn 3i protrudes radially with respect to the axis Xi, towards the outside of the circle 115 or towards the inside of the circle 116 in at least one point, it is characterized that the spring 1 is non-compliant and that it is likely to produce noise when integrated with the spring brake. In the case of example of FIG. 5, this condition is not confirmed because a point 11A is not between the circles 115 and 116. Otherwise where this condition is confirmed (not shown), there is the assurance before installing the spring 1 in the spring brake, that the spring brake will be noiseless once the spring 1 is mounted.

The chosen portion of the inner turn contour 11 preferably corresponds to the portion of a turn intended to be in frictional contact with the friction member of the spring brake. The chosen portion of each turn 3i may extend over only a portion of the turn 3i in question, for example over a portion of 90° of the turn 3i. Preferably, on the contrary, the selected portion extends over the entire turn 3i in question, i.e. 360° of the coil 3i in question. Preferably, it is checked that any selected portion of the contour 11 of each turn 3i is between the circles 115 and 116, when the spring 1 is in the free state, while optionally excluding the excluded portions 18 and 19 of the wire 2 as defined above. If this condition is not satisfied, i.e. if at least a chosen portion of the contour 11 is not between the circles 115 and 116, the spring 1 is characterized as being non-compliant.

Whatever the embodiment considered, the method for checking the compliance of the spring 1 is performed at the end of a manufacturing step of the spring 1 and before the integration of the spring 1 in the spring brake.

The compliance checking method may include other substeps to characterize the compliance of the spring 1.

In particular, in the case of the first embodiment and to characterize the spring 1 as being compliant, it is also possible to check the cylindricity of the spring 1 in the free state. More specifically, it is preferably checked that at least a selected portion, or even all, of the external guide curves 30 of the turns 3i, excluding the excluded portions 18 and 19, is between two coaxial, preferably cylinders with coaxial tolerance with the axis O1. The tolerance cylinders are theoretical and perfect, and each has a circular base of different radius, wherein the difference of the radius of the tolerance cylinders has a predetermined tolerance interval value. For example, this tolerance value is less than 0.20 mm and preferably equal to 0.15 mm. The spring 1 is then characterized as being compliant only if this condition is confirmed. In the opposite case where at least one point of the external guide curves 30 is not between the two tolerance cylinders, the spring 1 is then declared as non-compliant. A similar method is implemented in the case of the second embodiment, by checking that all of the internal guide curves 31 of the turns 3i, excluding the excluded portions 18 and 19, are between two coaxial tolerance cylinders whose radii are different from a predetermined tolerance value.

To characterize the compliance of the spring 1, the absence of rust, soap and grease on the spring 1 may also be checked. In fact, rust, soap and grease may contribute to the generation of noise by the spring 1, so that the spring 1 is only confirmed as being compliant if the absence of these elements is confirmed.

Correspondingly, it is also possible to characterize the conformity of the friction member of the spring brake intended to interact with the spring 1, in particular by carrying out checks relating to its cylindricity, its surface condition, its hardness and/or its material.

Figure 6:
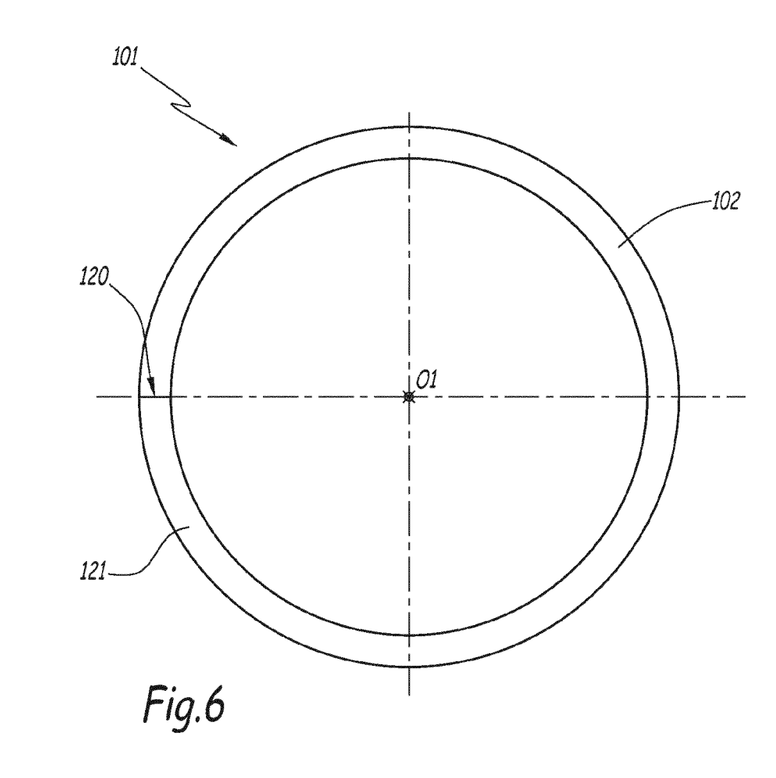
FIGS. 6 and 7 show views respectively similar to FIGS. 1 and 2 of the spring of FIGS. 1 to 4 during manufacture.
Figure 7:
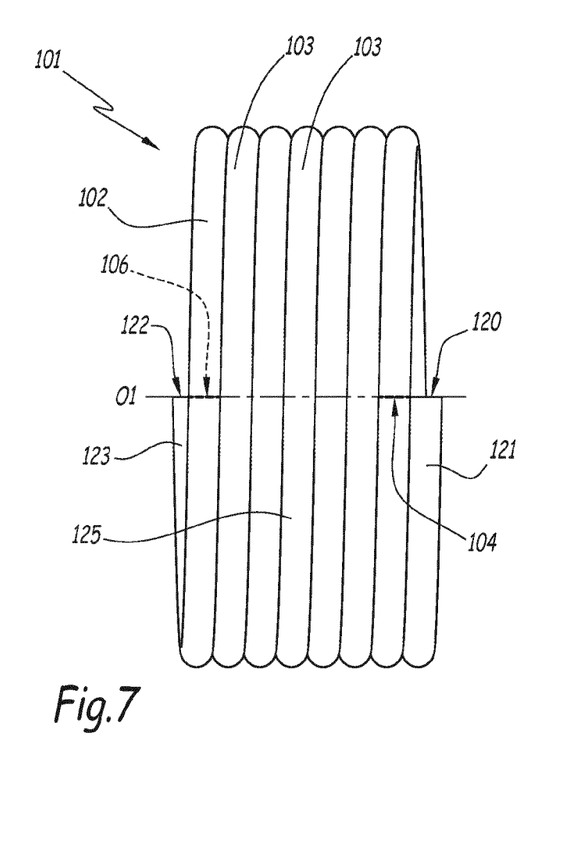

To manufacture the clamping or spreading spring 1, a raw wire 102 is provided, which is for example of rectilinear shape and is wound to form the raw wire 102 according to a plurality of raw turns 103 and illustrated in FIGS. 6 and 7. A spring blank 101 is thus formed. Some of the raw turns 103 are intended to form the turns 3i of the spring 1 once the manufacturing has been completed. The turns 103 are designed to be coaxial with a common axis O1 shown in FIGS. 6 and 7, corresponding to the future main axis O1 of the spring 1 shown in FIGS. 1 and 2.

The raw wire 102 has a first raw portion 121 extending from a first end 120 of the raw wire 102 to an intermediate position 104 of the raw wire 102. The raw wire 102 also has a second raw portion 123 extending from a second end 122 of the raw wire 102, opposite the first end 120, to an intermediate position 106 of the raw wire 102. The intermediate position 106 is shown by dashed lines in a portion of the raw wire 102 not visible in FIG. 6. In the present example, the first raw portion 121 and the second raw portion 123 each extend over about a complete raw turn 103 of the raw wire 102. Preferably, the raw portions 121 and 123 extend over more than one raw turn 103. The raw portions 121 and 123 advantageously extend over approximately 1.25 raw turns 103. Finally, the raw wire 102 has an intermediate portion 125 extending from the first raw portion 121 to the second raw portion 123. In other words, the intermediate portion 125 extends from the intermediate position 104, which forms a first end of the intermediate portion 125, up to the intermediate position 106, which forms a second opposite end of the intermediate portion 125. The length of the raw wire 102 of the intermediate portion 125 is of identical value to that of the length of the wire 2 of the spring 1, from the end 4 to the end 6.

The manufacturing method then comprises a step of separating the first raw portion 121 and the second raw portion 123 of the raw wire 102. This separation is obtained by cutting the raw wire 102 at the intermediate positions 104 and 106. The intermediate portion 125 then becomes the wire 2 of the spring 1 of the main axis O1. The intermediate positions 104 and 106 become the ends 4 and 6 respectively. Thus, at least one raw turn 103 is separated from each end 104 and 106 of the intermediate portion 125, which advantageously makes it possible to reduce the risk of non-compliance of the spring 1. In fact, in practice, the compliance of the raw wire 102 in a spiral generally causes shape defects on the end raw turns 103. As the portions 121 and 123 include these end turns, their separation from the final spring 1 reduces the risk of non-compliance of the latter.

The manufacture of the spring 1 also comprises:
  a substep of conformation of the first tab 5, at the first end 104, or intermediate position 104, of the intermediate portion 125 by folding the raw wire 102,
  a substep of conformation of the second tab 7, at the second end 106, or intermediate position 106, of the intermediate portion 125, by folding the raw wire 102.

The folding of the tabs 5 and 7 is effected by forming the folds 8 and 9. At the end of their conformation, the tabs 5 and 7 are each oriented radially towards the main axis O1. The conformation of the tabs 5 and 7 is performed either before or after the separation of the blank portions 121 and 123.

In any event, a portion of the raw turns 103 of the intermediate portion 125 becomes the turns 3i of the spring 1, while two other portions of the raw turns 103 become respectively the tabs 5 and 7.

Advantageously, the method of manufacturing the spring 1 comprises a step of mechanical burnishing of the outer surface of the turns of the spring 1. The mechanical burnishing is an industrial method using a burnishing technique with rollers to change the initial shape of a part.

Thus, the burnishing of the outer surface of the turns of the spring 1 makes it possible to modify the section of the wire forming the spring 1 and, in particular, to flatten the outer surface of the spring 1.

In this way, the burnishing of the outer surface of the turns of the spring 1 reduces the contact pressure of at least one turn of the spring 1 on the inner surface 27 of the housing 26 of the drum 23 during operation of the spring brake 14 with respect to the contact pressure of at least one turn of the spring 1 with circular section.

The decrease in contact pressure of at least one turn of the spring 1 on the inner surface 27 of the housing 26 of the drum 23 is due to the increase in surface of at least one turn of the spring 1 on the inner surface 27.

Consequently, the burnishing of the outer surface of the turns of the spring 1 makes it possible to reduce the operating noise of the spring brake 14 since a reduction in the contact pressure of at least one turn of the spring 1 on the inner surface 27 of the spring housing 26 of the drum 23 during operation of the spring brake 14, facilitates the lubrication of the contact areas between the spring 1 and the inner surface 27 of the housing 26 of the drum 23.

Preferably, following the burnishing step, the method comprises a step of thermo-chemical treatment of the surface of the spring 1.

Advantageously, the thermo-chemical surface treatment of the surface of the spring 1 is a thermo-chemical surface treatment called "DLC" (Diamond-like Carbon).

The technique known as "DLC" consists in implementing a thin-layer deposition of amorphous carbon, for example of a thickness of three microns.

Thus, the technique known as "DLC" makes it possible to increase the level of hardness of the surface of the spring 1 and to improve the lubrication of the surface of the spring 1.

In this way, the high level of hardness of the surface of the spring 1 makes it possible to resist the shear induced by the operation of the spring brake 14, to limit the wear of the spring 1 and, consequently, to avoid the generation of abrasive particles.

In addition, the thermo-chemical surface treatment of the spring 1 ensures a better frictional stability of at least one turn of the spring 1 on the inner surface 27 of the housing 26 of the drum 23, during the frictional contact of at least one turn of the spring 1 on the inner surface 27.

In addition, the hardening of the surface of the spring 1 makes it possible to avoid polishing the surface of the spring 1, wherein this polishing may cause unstable behavior of the spring brake 14 and the appearance of noise during the operation of the spring brake 14.

Moreover, the technique known as "DLC" makes it possible to obtain a low coefficient of friction at the surface of the spring 1, so as to promote stable behavior of the spring brake 14 and to limit the occurrence of noise during the operation of the spring brake 14.

As a variant, following the burnishing step, the method comprises a step of mechanical surface treatment of the surface of the spring 1.

Advantageously, the mechanical surface treatment of the surface of the spring 1 is a mechanical surface treatment called "tribofinishing".

The technique known as "tribofinishing" has the effect of generating random deformations of the surface of the spring 1, so as to promote the lubrication of the spring 1 and the creation of reserves of a lubricant, such as grease, in the areas of contact between the spring 1 and the inner surface of the housing 26 of the drum 23.

Preferably, the step of mechanical surface treatment of the surface of the spring 1, in particular the so-called "tribofinishing", is implemented as a replacement for the thermo-chemical treatment step of the surface of the spring 1, in particular referred to as "DLC".

Alternatively, following the burnishing step, the method may comprise a step of chemical surface treatment of the surface of the spring 1.

Advantageously, the chemical surface treatment of the spring 1 is a chemical surface treatment by deposition. Such a chemical surface treatment may correspond, for example, to a chemical surface treatment called "NiP HP" (Nickel-Phosphorus High Phosphorus).

The technique called "NiP HP" consists of implementing a layer of nickel and phosphorus layer, for example of a thickness of twenty microns.

Thus, the technique called "NiP HP" makes it possible to reduce the roughness of the surface of the spring 1 and, consequently, to hide the grooves related to the step of obtaining the spring 1.

In addition, the technique known as "NiP HP" makes it possible to increase the level of hardness of the surface of the spring 1 and to improve the lubrication of the surface of the spring 1.

Preferably, the step of chemical surface treatment of the surface of the spring 1, in particular referred to as "NiP HP", is implemented in place of the thermo-chemical treatment step of the surface of the spring 1, in particular called "DLC". Once all of the aforementioned manufacturing sub-steps have been performed, the compliance checking method of the spring 1, as explained above, is implemented.

The invention relates to a spring 1 which may be characterized as being compliant according to the method explained above, at least as regards the circularity of the turns 3*i*.

The technical characteristics of each variant described above may be used in other variants as far as technically feasible.

The invention claimed is:

1. A spring brake comprising:
   a friction member; and
   a spring comprising a wire wound in a plurality of turns, each of the turns being centered on a turn axis, the turns being included in a spiral according to which the spring is shaped, the spiral being configured to be coaxial with a main axis of the spring, the spring being mounted within the spring brake and in radial frictional contact with the friction member of the spring brake,
   wherein a first end portion of the wire, which extends from a first end of the wire, out of the spiral of the spring, is shaped according to a first tab,
      a second end portion of the wire, which extends from a second end of the wire, out of the spiral of the spring, is shaped according to a second tab,
      the first tab and the second tab are each directed in a substantially radial direction towards the inside of the spring,
      in projection in a plane orthogonal to the main axis, the first tab and the second tab are curved towards each other,
   the curvature of the first tab corresponds to the curvature of the turns, and
   the curvature of the second tab corresponds to the curvature of the turns.

2. The spring brake according to claim 1, wherein the wire defines, for each of the turns, in projection in a turn plane orthogonal to the turn axis, an outer coil contour and an inner coil contour, and
   wherein for outer tolerance circles defined for each of the turns, each of the outer tolerance circles is centered on the turn axis and drawn in the turn plane, each of the outer tolerance circles having an outer radius,
      for inner tolerance circles defined for each of the turns, each of the inner tolerance circles is centered on the turn axis and drawn in the turn plane, each of the inner tolerance circles having an inner radius having a value less than that of the outer radius with a predetermined tolerance interval value of between 0.05 and 0.15 millimeters, and
   wherein one of: (i) any selected portion of the outer turn contour of each of the turns lies between the outer tolerance circle and the inner tolerance circle, and (ii) any chosen portion of the inner turn contour of each of the turns lies between the outer tolerance circle and the inner tolerance circle.

3. The spring brake according to claim 2, wherein the predetermined tolerance value is equal to 0.10 millimeters.

4. The spring brake according to claim 2, wherein the selected portion extends over the entire turn.

5. The spring brake according to claim 1, wherein the spring is a torsion spring configured to interact with members exerting torques about the main axis of the torsion spring, the torques being applied on the first tab and the second tab.

6. The spring brake according to claim 1, wherein the wire is in external radial frictional contact with the friction member, the friction member constituting a drum in which the spring is configured to be housed.

7. The spring brake according to claim 1, wherein the wire is in contact with the friction member with internal radial friction, the friction member constituting a hub around which the spring is configured to be mounted.

8. A method of manufacturing a spring including a wire having a plurality of turns, each of the turns being centered on a turn axis, the spring being configured to be mounted within a spring brake and to be in radial frictional contact with a friction member of the spring brake, the manufacturing method comprising:
conforming and cutting comprising:
winding conforming a raw wire according to a plurality of raw turns, so that each of the raw turns is substantially coaxial with a common main axis, the raw wire having
a first raw portion extending from a first end of the raw wire over at least one raw turn,
a second raw portion extending from a second end of the raw wire, opposite the first end of the raw wire over at least one raw turn, and
an intermediate portion between the first raw portion and the second raw portion;
separating by cutting the first raw portion and the second raw portion of the raw wire after the winding conforming, the intermediate portion then becoming the wire of the spring, at least a portion of the raw turns of the intermediate portion becoming the turns of the spring;
conforming by folding a first tab at a first end of the intermediate portion after the winding conforming and before or after the separating, the first tab being curved, the curvature of the first tab corresponding to the curvature of the turns; and
conforming by folding a second tab at a second end of the intermediate portion opposite the first end, after the winding conforming and before or after the separating, the second tab being curved, the curvature of the second tab corresponding to the curvature of the turns.

9. A spring brake comprising:
a friction member; and
a spring obtained using the manufacturing method of claim 8, the spring comprising the wire wound in the plurality of turns, each of the turns being centered on a turn axis, the turns being included in a spiral according to which the spring is shaped, the spiral being configured to be coaxial with the common main axis of the spring, the spring being mounted within the spring brake and in radial frictional contact with the friction member of the spring brake,
wherein a first end portion of the wire, which extends from a first end of the wire, out of the spiral of the spring, is shaped according to the first tab,
a second end portion of the wire, which extends from a second end of the wire, out of the spiral of the spring, is shaped according to the second tab,
the first tab and the second tab are each directed in a substantially radial direction towards the inside of the spring,
in projection in a plane orthogonal to the main axis, the first tab and the second tab are curved towards each other,
the curvature of the first tab corresponds to the curvature of the turns, and
the curvature of the second tab corresponds to the curvature of the turns.

10. The manufacturing method according to claim 8, wherein the first raw portion extends over 1.25 raw turns, and
the second raw portion extends over 1.25 raw turns.

11. The manufacturing method according to claim 8, wherein the wire of the spring formed during the conforming and cutting defines, for each of the turns in projection in a turn plane orthogonal with respect to the turn axis, an outer turn contour and an inner turn contour, the manufacturing method further comprising, after the conforming and cutting,
checking compliance of the formed spring, the checking compliance comprising:
defining, for each of the turns, an outer tolerance circle centered on the turn axis and drawn in the turn plane, the outer tolerance circle having an outer radius, and
defining, for each of the turns, an inner tolerance circle centered on the turn axis and drawn in the turn plane, the inner tolerance circle having an inner radius having a value that is less than that of the outer radius, of a predetermined tolerance interval value,
characterizing a conformity of the spring, the characterizing comprising one of:
(i) characterizing the spring as being compliant when, for each of the turns, each selected portion of the outer turn contour lies between the outer tolerance circle and the inner tolerance circle, and
characterizing the spring as being non-compliant when, for at least one of the turns, at least one selected portion of the outer turn contour protrudes, radially with respect to the turn axis, outwards of the outer tolerance circle or inwards of the inner tolerance circle in at least one point, and
(ii) characterizing the spring as being compliant when, for each of the turns, any selected portion of the inner turn contour is between the outer tolerance circle and the inner tolerance circle, and
characterizing the spring as being non-compliant when, for at least one of the turns, at least a selected portion of the inner turn contour protrudes radially outwards from the outer tolerance circle or towards the inside the inner tolerance circle in at least one point; and
integrating the spring into the spring brake only when the spring is characterized as being compliant.

12. The manufacturing method according to claim 11, wherein the portion chosen during the checking compliance extends over the entire turn in question.

13. The manufacturing method according to claim 11, wherein the spring comprises a first excluded portion of the wire, extending from a first end of the wire, and a second excluded portion of the wire, extending from a second end of the wire opposite the first end,
wherein the first excluded portion and the second excluded portion each extend only over a portion of the turn of the spring, and wherein the compliance of the spring is characterized by excluding the first excluded portion and the second excluded portion of any chosen portion.

14. The manufacturing method according to claim 11, wherein:
the characterizing the spring as being compliant when each selected portion of the outer turn contour lies between the outer tolerance circle and the inner tolerance circle and characterizing the spring as being non-compliant when the at least one selected portion of the outer turn contour protrudes outwards of the outer tolerance circle or inwards of the inner tolerance circle in at least one point are carried out when the wire is to be in external radial frictional contact with the friction member, and
characterizing the spring as being compliant when any selected portion of the inner turn contour is between the outer tolerance circle and the inner tolerance circle and characterizing the spring as being non-compliant when at least the selected portion of the inner turn contour protrudes radially outwards from the outer tolerance circle or towards the inside the inner tolerance circle in the at least one point are carried out when the wire is to be in contact with the friction member with internal radial friction.

15. The manufacturing method according to claim 14, wherein the wire is configured to be in external radial frictional contact with the friction member and the friction member constitutes a drum in which the spring is configured to be housed.

16. The manufacturing method according to claim 14, wherein the wire is configured to be in contact with the friction member with internal radial friction and the friction member constitutes a hub around which the spring is configured to be mounted.

17. The manufacturing method according to claim 11, wherein the tolerance range value is between 0.05 and 0.15 millimeters.

18. The manufacturing method according to claim 17, wherein the tolerance range value is equal to 0.10 millimeters.

19. The manufacturing method according to claim 11, wherein the characterizing the conformity is performed while the spring is in a free state.

20. The manufacturing method according to claim 11, wherein:
during the characterizing the spring as being compliant when each selected portion of the outer turn contour lies between the outer tolerance circle and the inner tolerance circle, the spring is characterized as being compliant only when at least one selected portion of an external guide curve, defined for each of the turns of the spring, is included between two coaxial tolerance cylinders, and
during the characterizing the spring as being non-compliant when the at least one selected portion of the outer turn contour protrudes outwards of the outer tolerance circle or inwards of the inner tolerance circle in at least one point, the spring is characterized as being compliant only when at least one selected portion of an internal guide curve, defined for each of the turns of the spring, is between two coaxial tolerance cylinders.

21. A method of manufacturing the spring brake in which the spring obtained by the manufacturing method according to claim 8, is mounted, wherein the spring is in radial frictional contact with a friction member of the spring brake.

22. The manufacturing method according to claim 10, wherein the wire of the spring formed during the conforming and cutting defines, for each of the turns in projection in a turn plane orthogonal with respect to the turn axis, an outer turn contour and an inner turn contour, the manufacturing method further comprising, after the conforming and cutting,
checking compliance of the formed spring, the checking compliance comprising:
defining, for each of the turns, an outer tolerance circle centered on the turn axis and drawn in the turn plane, the outer tolerance circle having an outer radius, and
defining, for each of the turns, an inner tolerance circle centered on the turn axis and drawn in the turn plane, the inner tolerance circle having an inner radius having a value that is less than that of the outer radius, of a predetermined tolerance interval value,
characterizing a conformity of the spring, the characterizing comprising one of:
(i) characterizing the spring as being compliant when, for each of the turns, each selected portion of the outer turn contour lies between the outer tolerance circle and the inner tolerance circle, and characterizing the spring as being non-compliant when, for at least one of the turns, at least one selected portion of the outer turn contour protrudes, radially with respect to the turn axis, outwards of the outer tolerance circle or inwards of the inner tolerance circle in at least one point, and
(ii) characterizing the spring as being compliant when, for each of the turns, any selected portion of the inner turn contour is between the outer tolerance circle and the inner tolerance circle, and characterizing the spring as being non-compliant when, for at least one of the turns, at least a selected portion of the inner turn contour protrudes radially outwards from the outer tolerance circle or towards the inside the inner tolerance circle in at least one point; and
integrating the spring into the spring brake only when the spring is characterized as being compliant.

23. The manufacturing method according to claim 12, wherein the spring comprises a first excluded portion of the wire, extending from a first end of the wire, and a second excluded portion of the wire, extending from a second end of the wire opposite the first end,
wherein the first excluded portion and the second excluded portion each extend only over a portion of the turn of the spring, and
wherein the compliance of the spring is characterized by excluding the first excluded portion and the second excluded portion of any chosen portion.

* * * * *